United States Patent [19]
Davies et al.

[11] Patent Number: 5,999,287
[45] Date of Patent: Dec. 7, 1999

[54] NODE IN OPTICAL TDM NETWORK

[75] Inventors: David Arthur Owen Davies, GT Finborough; Andrew David Ellis, Ipswich, both of United Kingdom

[73] Assignee: British Telecommunications public limited company, London, United Kingdom

[21] Appl. No.: 08/860,012

[22] PCT Filed: Dec. 21, 1995

[86] PCT No.: PCT/GB95/03017

§ 371 Date: Jul. 17, 1997

§ 102(e) Date: Jul. 17, 1997

[87] PCT Pub. No.: WO96/20545

PCT Pub. Date: Jul. 4, 1996

[30] Foreign Application Priority Data

Dec. 23, 1994 [EP] European Pat. Off. .............. 94309761

[51] Int. Cl.[6] .......................... H04B 10/20; H04J 14/08; H04J 10/00
[52] U.S. Cl. .................. 359/118; 359/119; 359/136; 359/135; 359/139; 359/158; 359/138
[58] Field of Search ..................... 359/128, 139, 359/138, 158, 135, 122, 178, 134

[56] References Cited

U.S. PATENT DOCUMENTS

| | | | |
|---|---|---|---|
| 5,309,267 | 5/1994 | Huang | 359/139 |
| 5,479,291 | 12/1995 | Smith | 359/333 |
| 5,493,433 | 2/1996 | Pruncal | 359/123 |
| 5,497,386 | 3/1996 | Fontana | 372/18 |
| 5,548,433 | 8/1996 | Smith | 359/158 |
| 5,742,415 | 4/1998 | Manning | 359/128 |
| 5,900,956 | 5/1999 | Cotter | 359/139 |

FOREIGN PATENT DOCUMENTS

WO A 91 14963 10/1991 WIPO .
WO A 93 22855 11/1993 WIPO .

OTHER PUBLICATIONS

Electronics Letters, vol. 29, No. 13, Jun. 24, 1993 Stevenhage, Herts., pp. 1167–1168, XP 000378386 Eislet M et al "All Optical High Speed Demultiplexing with a Semiconductor Laser Amplifier in a Loop Mirror Configuration".

Electronics Letters, vol. 28, No. 14, Jul. 2, 1992 pp. 1350–1352, xp 000307842 Jinno M et al "All–Optical Regenerator Based on Nonlinear Fibre Signac Interferometer".

Electronics Letters, vol. 30, No. 16, Aug. 4, 1994 Stevenage GB, pp. 1333–1334, XP 000468818 Ellis et al. "Three–node, 40 gbits/s OTDM network experiment using electro–optic switches".

Electronics Letters, Sep. 17, 1993, UK, vol. 29, No. 19, Sep. 16, 1993 ISSN 0013–5194, pp. 1714–1716, Kawanishis et al "Ultrahigh–speed phaselocked–loop–type clock recovery circuit using a travelling–wave laser diode amplifier as a 50 Ghz phase detector".

Electronics Letters, vol. 26, No. 14, Jul. 5, 1990 Stevenhage, Herts., pp. 962–964, XP 000107118 Blow K J et al "Demonstration of the Nonlinear Fibre Loop Mirror as an Ultrafast All–Optical Demultiplexer".

Electronics Letters, vol. 30, No. 4, pp. 341/342 XP 000439532 Patrick D M et al "Demultiplexing Using Polarisation Rotation in a Semiconductor Laser Amplifier".

*Primary Examiner*—Jason Chan
*Assistant Examiner*—Agustin Bello
*Attorney, Agent, or Firm*—Nixon & Vanderhye P.C.

[57] ABSTRACT

A node for an optical time division multiplexed communication system, and a method of operating such a node, are disclosed. In embodiments of the invention, the node comprises a multiplexer for receiving a plurality of optical signals, and a source of optical radiation, which may be a continuous wave source, or a source of optical pulses. The node is arranged so that the outgoing optical time division multiplexed signal consists only of optical pulses from the source of optical radiation.

20 Claims, 5 Drawing Sheets

NODE IN OPTICAL TDM NETWORK

BACKGROUND TO THE INVENTION

The present invention relates to optical time division multiplexed communication systems, and in particular, to a node for use in such systems, and to a method of operating a node for such systems.

Telecommunications operators, in order to meet the demand from their customers for increasingly sophisticated and bandwidth intensive services, require networks which are reconfigurable, and which operate at higher data rates than those installed to date. Optical transmission links have been utilised in telecommunications networks to increase the data carrying capacity of the network from one point to another point. It is known to employ OTDM (optical time division multiplexing) to share the bandwidth available on the optical transmission link between several channels by interleaving the channels in time. To increase the flexibility of the communications network, provision is often made, at nodes of the network, to extract, or "drop", a channel or channels at a node, or to add, or "insert", a channel or channels at a node. Both for point to point OTDM systems, and for OTDM networks, if the processing (ie. multiplexing, de-multiplexing, drop, and insert) is carried out electronically, the data carrying capacity of the communications system will be limited by the operating speed of the electronic components. Thus, rather than converting optical signals to electronic signals at each node of the network, carrying out any necessary processing on the signals electronically, and reconverting the resultant electronic signals to optical signals for onward transmission, it is desirable to perform the processing functions optically so as not to restrict the bandwidth of the OTDM system.

Many of the experimental OTDM systems employing optical processing that have been reported, for example by D M Spirit and L C Blank in "Optical Time Division Multiplexing For Future High Capacity Network Applications", BT Technology Journal Vol. 11 No. 2, April 1993, interleave optical channels which have originated from the same single optical source. However, when practical OTDM systems are considered, there is a high likelihood that each optical channel will originate from a different optical source, so that the optical signal leaving a node of the network contains interleaved pulses from a number of distinct optical sources. If these numerous optical sources do not produce substantially identical, high quality optical pulses the error rate of the OTDM system may become unacceptable upon subsequent transmission. Furthermore these experimental OTDM systems often comprise single point to point optical links.

For an OTDM network, as opposed to a point to point link, a further problem arises because each optical channel received at a particular node of the network may have travelled a different distance. Thus in an OTDM network, even if all the optical sources produce identical optical pulses, or a single optical source is employed for the whole network (as suggested in Spirit and Blank), the outgoing optical pulses from a particular node will have different optical properties. The outgoing optical pulses may, for example, be of differing widths due to dispersion suffered during transmission over previous links of different lengths. The pulses are attenuated during transmission and the changes in pulse width make it difficult to match the local launch power to that of the received pulses, since the ratio of mean to peak power varies with pulse width. These differing optical properties of the pulses may cause difficulties both within the node (eg. affecting the receiver sensitivity and switching efficiency), and in their subsequent propagation in the OTDM network where the differing optical properties of the pulses may cause them to evolve in a different manner leading, for example, to time slot errors. These effects would be cumulative as further nodes of the OTDM network are encountered, and would be exacerbated in a practical system where numerous, non-identical, optical sources are likely to be employed.

SUMMARY OF THE INVENTION

According to a first aspect of the present invention, there is provided a node for an optical time division multiplexed communication system, the node comprising:

a multiplexer having a plurality of input means for receiving data signals, at least one of said input means receiving, in use, optical data signals;

output means for transmitting a time division multiplexed optical data signal; and a source of optical radiation, wherein the optical data signal transmitted by the output means consists only of optical pulses from said source.

According to a second aspect of the present invention, there is provided a method of operating a node in an optical time division multiplexed communication system, the method comprising the steps of:

receiving a plurality of data signals at the node, at least one of said signals being an optical data signal; and transmitting an optical data signal from said node, characterised in that the transmitted optical data signal consists only of optical pulses from a single source of optical radiation.

Thus, by providing a source of optical radiation which is local to the node, and ensuring that the optical data signal transmitted onwards by the node consists only of optical pulses from this local source, the present invention provides a number of advantages. All optical pulses leaving the node can be of a consistent character, regardless of the origin, and transmission history, of the data signals received by the node. It can thus be easily ensured that all pulses leaving the node are of high optical quality e.g. that they have the same centre wavelength, and amount of chirp. The error rate performance of the optical transmission link between a first node and a second node in a communications network is thus less likely to depend on the origin of she data signals received by the first node. Furthermore, the use of nodes according to the present invention dispenses with the need for optical sources at each node within the network to be identical.

A further advantage of the present invention is that the entire output of a node may be easily tuned in wavelength. This may be advantageous if wavelength division multiplexing techniques are to be combined with OTDM.

Although the source of optical radiation of the node may be a continuous wave source, preferably the source of optical radiation is a source of optical pulses. By providing a source of optical pulses, any error in the pulse width or pulse location of pulses in the OTDM signal entering the node can be corrected.

The present invention may be applied to nodes which are not all optical. For example, a node may receive an OTDM optical signal at a high bit rate from a remote node, and receive a low bit rate electrical signal generated locally to the node, and may combine these incoming optical and electrical signals to give an outgoing optical OTDM signal. In this case, the node may convert the locally generated electrical signal to an optical signal, prior to inserting this local signal into the OTDM optical signal. Although embodiments of the present invention do not require means for recovering a clock signal from an input data signal (for example if the node performs only an add function, and not a drop function), preferably the node is provided with clock recovery means for recovering a clock signal from an input data signal.

The clock recovery means may be electrical, or optical. Electrical clock recovery means are, at present, simpler to implement than optical means, and can operate at very high data rates, up to 100 GHz operation is likely. Electronic clock recovery at these data rates is feasible since far lower bandwidth operation is needed for clock recovery, as opposed to data detection. The recovered electrical clock signal is then preferably employed to synchronise the source of optical pulses, for example a mode locked fibre ring laser. A further advantage of employing electrical clock recovery is that any clock division that may be required within the node will be easier to perform electrically than optically. The term "gate" as used herein also encompasses a modulator used e.g. with a CW source and carrying out an analogous gating function.

Alternatively, the clock recovery means may be optical. Since the result of optical clock recovery is a stream of optical pulses at the clock frequency, in this case the clock recovery means may serve as the source of optical pulses. A mode locked ring laser incorporating some form of modulation, for example cross phase modulation, may be utilised as an optical clock recovery means.

Preferably, for both electrical or optical clock recovery means, there is provided an optically controlled gate. The optically controlled gate may be connected to receive a multiplexed optical signal from the multiplexer and optical pulses from the source of optical pulses, and to gate the optical pulses in accordance with the multiplexed optical signal. Clock division may be performed as part of the clock recovery process.

Although the multiplexer may comprise an electrically controlled device e.g. a Lithium Niobate modulator, preferably the multiplexer is an all optical device.

DESCRIPTION OF THE DRAWINGS

Embodiments of the present invention will now be described, by way of example only, and with reference to the accompanying drawings, in which.

DESCRIPTION OF EXAMPLES

Figure 1:
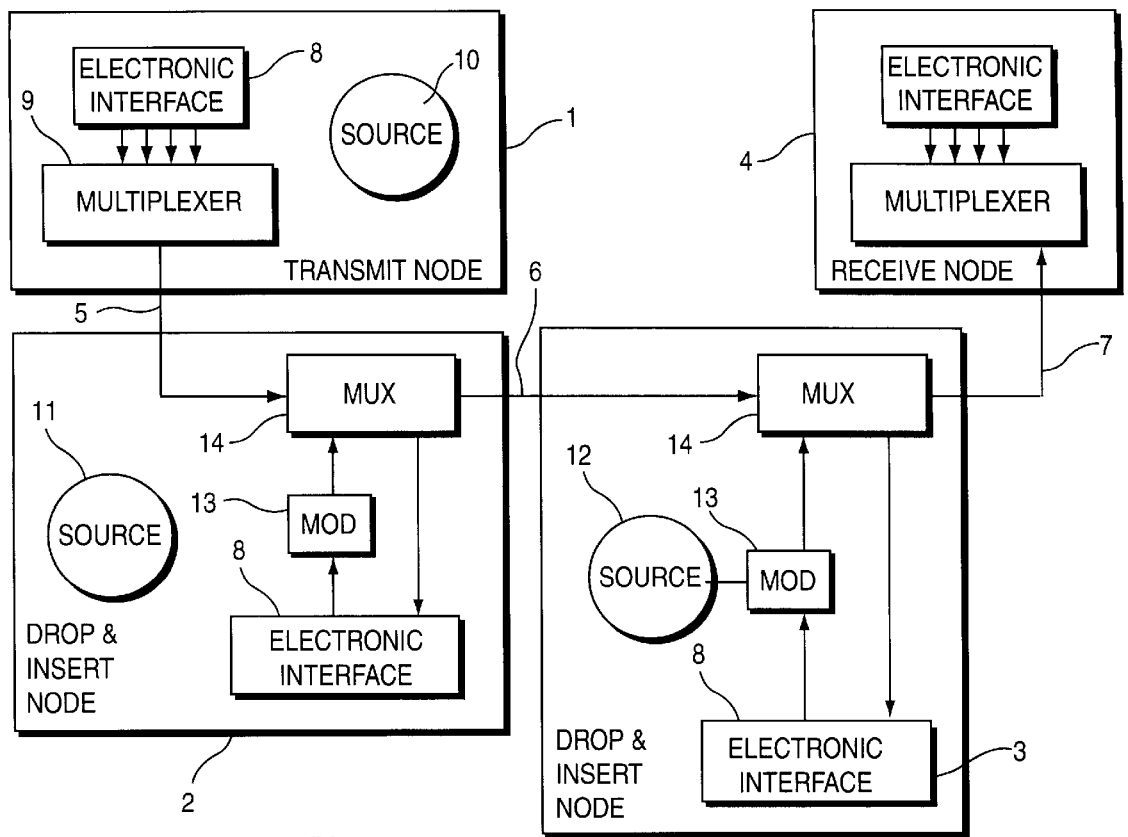
FIG. 1 is a schematic diagram showing a typical, prior art, OTDM network.

A typical OTDM network is shown in FIG. 1, having a transmit node 1, drop and insert nodes 2 and 3 and a receive node 4, connected by transmission links 5, 6, and 7. Transmission links 5, 6 and 7 may comprise optical amplifiers and regenerators. The transmit node 1 comprises an electronic interface 8, a multiplexer 9, and a source of optical pulses 10. In operation the optical pulse source transmits optical pulses to the transmission link 5 in accordance with the multiplexed signal produced by the multiplexer 9. The drop and insert nodes 2, and 3 comprise an electronic interface 8, sources of optical pulses 11 and 12, an optical modulator 13 and an optical multiplexer 14. In use, the drop and insert nodes 2 and 3 receive an optical OTDM signal from, respectively, the transmission link 5 or 6. The drop and insert node 2 or 3 will then either insert an additional channel to the optical OTDM signal, or extract i.e. drop, a channel from the OTDM signal.

For a conventional, or prior art, drop and insert node, if a channel is to be inserted a pulse source 11, local to the node 2, is modulated by a modulator 13, in accordance with the data in the channel to be inserted. This new optical channel is then inserted into an appropriate vacant time slot in the OTDM signal by the optical multiplexer 14. The output from the optical multiplexer 14, to the transmission link 6, thus comprises optical pulses which originate from the optical pulse source 10 of the transmit node 1, interleaved with optical pulses from the optical pulse source 11 of the drop and insert node 2. Since these pulses originate from different pulse sources they may have different optical characteristics e.g. centre wavelength, width, or chirp. Furthermore even if the optical pulse sources 10 and 11 are identical the pulses from optical pulse source 10 will have travelled along the transmission link 5 (and may have been amplified or regenerated) and thus, nevertheless are likely to have different optical characteristics when they arrive at drop and insert node 2. If a further channel is inserted to the OTDM optical signal at drop and insert node 3, this additional channel will comprise optical pulses from optical pulse source 12 of drop and insert node 3. Hence the OTDM optical signal arriving at receive node 4 may contain optical pulses originating from three distinct optical pulse sources 10, 11 and 12, which pulses have different transmission histories. This may lead to numerous problems at the receive node, for example time slot errors, or varying bit error rates between the channels. The source of these problems, within the OTDM network, will be difficult to trace.

Figure 2:
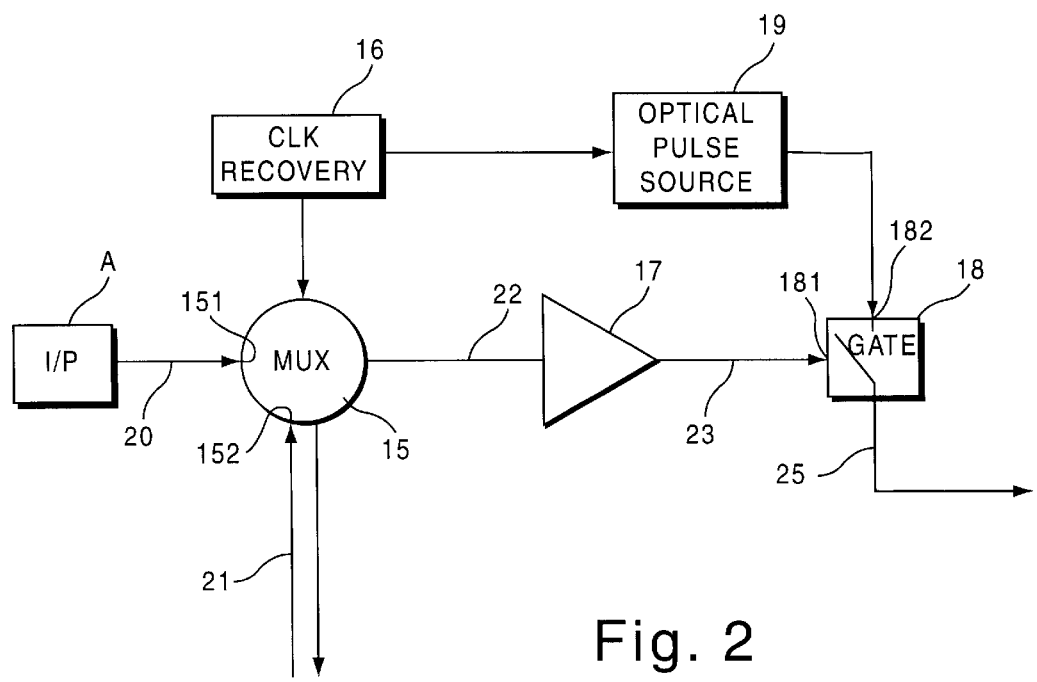
FIG. 2 is a schematic diagram of a node of an OTDM network, according to an embodiment of the present invention.

FIG. 2 shows a node of an OTDM network according to an embodiment of the present invention. The node comprises an optical multiplexer 15, a clock recovery sub-system 16 (which may be electrical or optical), an optical amplifier 17 and optically controlled gate 18. If the clock recovery sub-system 16 is electrical, the node further comprises an optical pulse source 19. The optical multiplexer 15, in use, receives an OTDM optical input signal 20 and a locally generated lower bit rate optical signal 21 for insertion into the OTDM signal 20. The lower bit rate signal 21 is inserted into a free channel of the OTDM signal 20 and the resulting multiplexed signal 22 is passed, via the optical amplifier 17 to the control input 23 of the optically controlled gate 18. The optical multiplexer 15 is also connected to the clock recovery sub-system 16. This connection is bidirectional, since the optical multiplexer 15 requires a clock signal in order to insert the low bit rate signal 21 into the correct time slot of the OTDM signal 20. If the clock recovery sub-system 16 generates optical clock pulses, these are passed directly to the input 24 of the optically controlled gate 18. If the clock recovery sub-system 16 generates electrical clock pulses, these are passed to the optical pulse source 19, are used to synchronise the pulse source 19, and the synchronised output of the pulse source 19 is passed to the input 24 of the optically controlled gate 18. The regular optical clock pulses, generated in the clock recovery sub-system 16, or the pulse source 19, enter the optically controlled gate at its input 24, and are gated by the multiplexed OTDM signal entering the control input 23 of the optically controlled gate 18. Thus all of the optical pulses comprising the OTDM signal 25 leaving the node originate from a single optical pulse source.

If it is desired to alter the wavelength of the outgoing OTDM signal, from that of the incoming OTDM signal, this can be easily achieved, simply by ensuring that the single optical pulse source is of the desired wavelength.

All components of the node according to the present embodiment are known per se and will now be described in greater detail.

Non-linear optical loop mirrors (NOLM) are capable of being used for ultrafast optical switching and signal processing, and have received considerable interest in recent years. A suitably configured NOLM is utilised in the embodiment of the present invention to provide the functionality of the optical multiplexer 15 (both for dropping channels and inserting channels), and furthermore may also be utilised to provide the functionality of the optically controlled gate 18.

Figure 3:
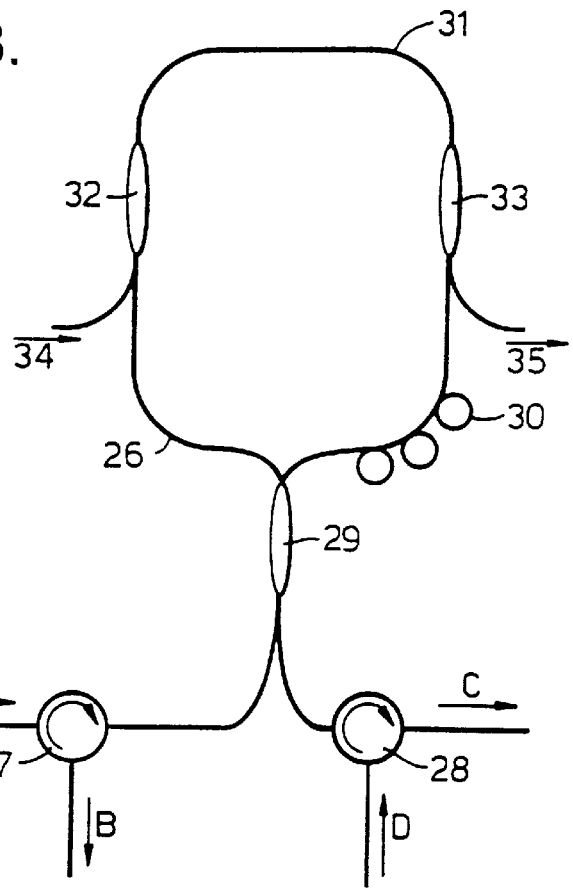
FIG. 3 is a schematic diagram of a non-linear optical loop mirror, utilised in an embodiment of the present invention as an optical multiplexer, and as an optically controlled gate.

FIG. 3 shows an NOLM comprising input ports A and D, output ports B and C connected to the fibre loop 26 via circulators 27 and 28 and a 50:50 fused coupler 29. The fibre loop 26 comprises a polarisation controller 30, a length of dispersion shifted fibre 31 and two WDM couplers 32 and 33. Such an NOLM is described in "Bit-rate Flexible All-Optical Demultiplexing Using a Non-linear Optical Loop Mirror", D M Patrick, A D Ellis and D M Spirit, Electronics Letters, Apr. 15, 1993, Vol. 29, No. 8, pp702–703, which is incorporated herein by reference. The OTDM optical signal to be processed is input to the NOLM via input port A, and a control signal is input to the NOLM via input port 34 of WDM coupler 32. The NOLM is able to optically process input optical signals because the input optical signals which co-propagate with the optical control pulses experience a greater cross phase modulation induced nonlinear phase shift than the counter propagating optical signals. In the absence of a control pulse, optical signals input at A will be output at B. However, when control pulses are input to input 34 of WDM coupler 32 the clockwise propagating optical signal, co-propagating with the control pulses, will experience a phase change, due to cross phase modulation in the dispersion shifted fibre. The anti-clockwise propagating optical signals, counter propagating relative to the control pulses, will not experience such a phase shift. Thus when the counter propagating optical signals return to the 50:50 coupler 29, for a relative phase shift of π radians, they will emerge from output port C. Hence a particular channel of the optical OTDM signal input at A can be "dropped" to output port C by appropriate control pulses input to the NOLM.

The control pulses, input at 34, can be generated either electrically, or optically. An electrical method of extracting an optical clock signal, utilising a phase locked loop, is described in "Ultrahigh-Speed Phase Locked-Loop-Type Clock Recovery Circuit Using a Travelling-Wave Laser Diode Amplifier as a 50 GHz Phase Detector", by S Kawaniski, H Takara, M Aruwatari and T Kitoh, Electronics Letters, Sep. 17, 1993, Vol.29, No.19, pp1714–1715. Although this technical paper describes the extraction of a single low frequency optical clock signal, this technique can be adapted to generate a clock pattern having pulses only in the channels which are to be dropped at the node, for example by optically splitting the low frequency clock signal and introducing appropriate optical delays before recombining the signal. An all optical technique for generating the control pulses to be input at 34, is described in our copending International patent application PCT/GB94/02239, incorporated herein by reference. This technique utilises a ring laser to generate a clock pattern comprising the control pulses to be input at 34. The cavity frequency of the ring laser is arranged to be an integer sub-multiple of the repetition rate of an individual OTDM channel. In order to start up the ring laser, it is arranged that only data in the OTDM channels to be dropped at the node is sent to the ring laser. The data in these channels then initiates pulse formation in the ring laser, and the output of the ring laser is directed to the input 34 of the NOLM shown in FIG. 3. The output from port C of the NOLM shown in FIG. 3, i.e. the dropped data, is directed to the input of the ring laser, so as to maintain pulse generation from the ring laser in the appropriate data channels.

In order to perform an insert function utilising the NOLM, the optical data to be inserted is applied to input D. In the presence of a control pulse in the NOLM the optical data input at D will be output from B, the dropped channel still being output from C. In the absence of a control pulse, the optical signal input at A will emerge from B. Thus it can be seen that the optical signal emerging from B comprises the OTDM signal applied to input A, minus the dropped channel emerging from output C, and with the addition of the inserted channel input at D. Hence, referring to FIG. 2, the OTDM signal for onward transmission 22 is that output from B.

A further, second NOLM, as described above and shown in FIG. 3, can be utilised as the optically controlled gate 18 shown in FIG. 2. In order to achieve the functionality required, the OTDM signal for onward transmission 23 is input to the WDM coupler at 34, and forms the control signal for the NOLM. The regular optical clock pulses generated by the optical clock recovery sub-system 16, or the optical pulse source 19, are input to the NOLM at A. The signals input at A are thus gated by the control signal input to the WDM coupler at 34, and are output from C. The output from C thus forms the OTDM signal for onward transmission 25, of FIG. 2.

Figure 4:
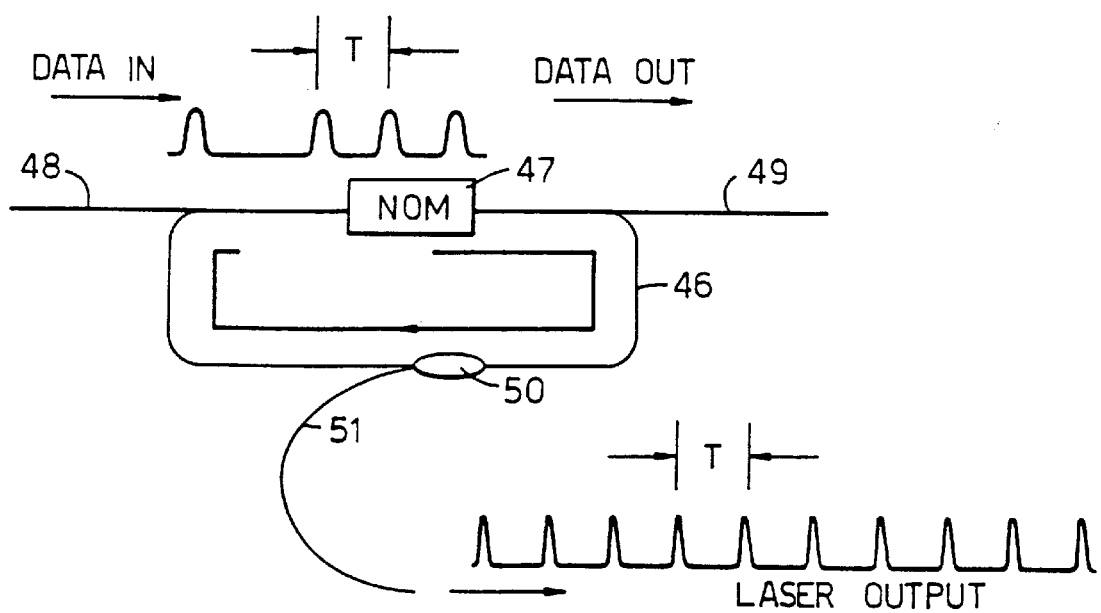
FIG. 4 is a schematic diagram of a mode locked fibre ring laser, utilised in an embodiment of the present invention as an optical clock recovery sub-system.

The optical clock recovery sub-system 16, of FIG. 2, comprises a mode locked fibre laser as described and claimed in our co-pending international patent application WO 93/22855, filed on Apr. 26, 1993, which is incorporated herein by reference. With reference to FIG. 4, the mode locked fibre laser comprises a loop of fibre 46 forming a ring laser cavity, a non-linear optical modulator 47, a data input 48 and output 49, and a coupler 50 having an output 51. In use, optical data is input to the mode locked fibre laser via input 48, and outputs, via output 51 of coupler 50, an optical clock pulse train locked to the timing waveform of the optical signal input at 48. The generation of the optical clock pulse train is achieved, as is fully described in our co-pending application WO 93/22855, due to cross phase modulation in the non-linear optical modulator which is converted to amplitude modulation by causing mode locking in the ring laser. When employed in embodiments of the present invention the mode locked fibre laser receives a multiplexed OTDM optical signal from the optical multiplexer 15, of FIG. 2, and outputs a train of optical clock pulses 24 to the optically controlled gate 18.

Figure 5A:
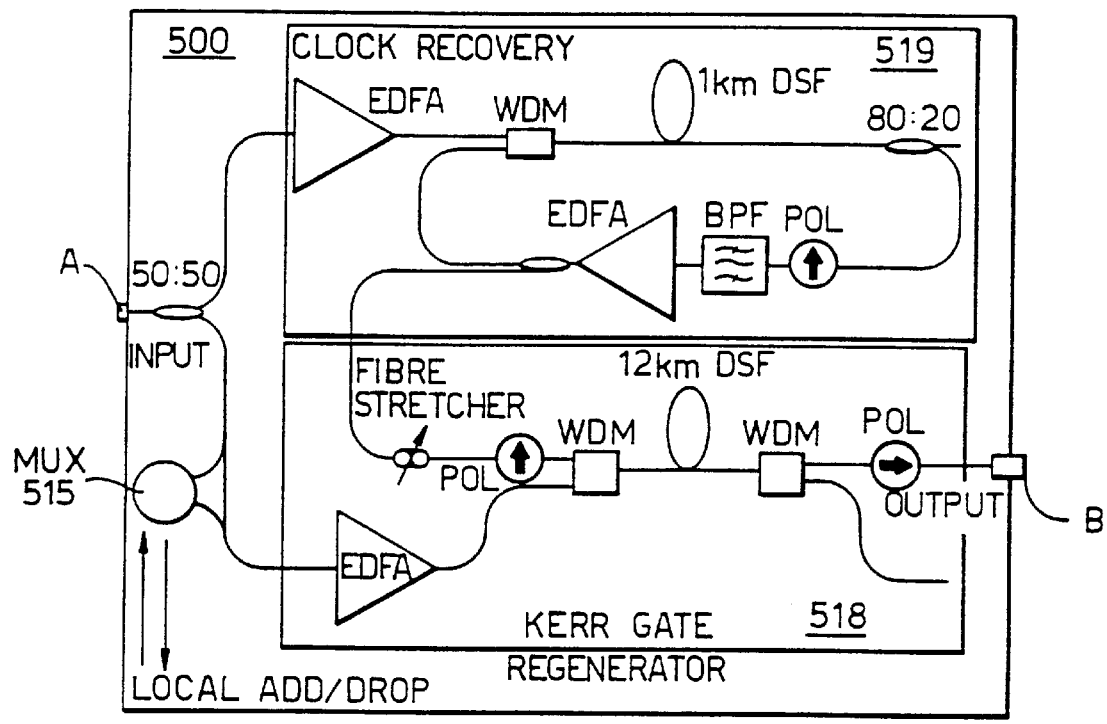
FIGS. 5A and 5B are schematics of a node using a Kerr gate regenerator, and a detail of an EDFA amplifier respectively.
Figure 5B:
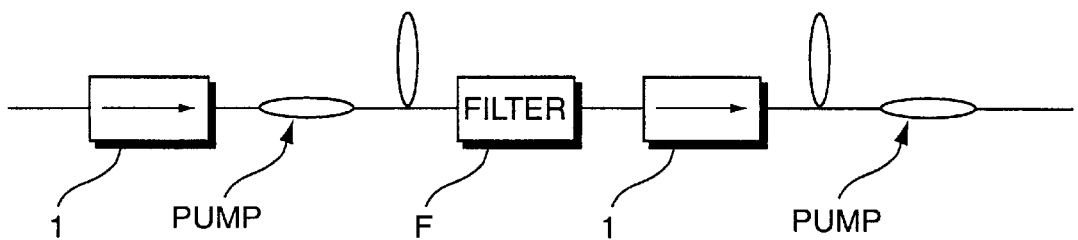

FIGS. 5A and 5B show in detail a further example of circuits of a node implementing the present invention.

The node 500 has an input port A which in use is connected to the network to receive an incoming OTDM datastream, and an output port B which is coupled to the network for the onwards transmission of data from the node. The input datastream is split at a 50:50 coupler manufactured by Sifam with one part going to a clock recovery/pulse generation stage 519 and the other part going via multiplexer 515 to regenerator stage 518.

In this example, the clock recovery of the pulse generation stage then uses the mode locked fibre laser described in our above-cited international patent application WO 93/22855. The circuit of the present example is modified in that, as is further described below, a polariser is included in the optical cavity.

The regenerator stage 518 is based on a fibre Kerr gate.

In the absence of data input, the clock recovery circuit lases continuous-wave as a fibre ring laser at the wavelength to which the band pass filter (BPF) is tuned, namely 1.553 $\mu$M. With an input datastream, light in the cavity co-propagates with the datastream along 1 km of dispersion shifted fibre (DSF), $\lambda_0$=1.550 $\mu$M. The datastream imposes a frequency modulation on the ring laser due to XPM (cross-phase modulation). The XPM is also accompanied by NPR (non-linear polarisation rotation) of the cavity light by the Kerr effect, which is converted to an amplitude modulation by the polariser in the cavity. The round trip time of the cavity is matched to a multiple of the datastream bit period, for stable mode locking. 20% of the cavity light is coupled out to form the recovered clock pulse stream which is re-modulated in the Kerr gate 518. The recovered clock pulses are passed to a polariser and propagate through a 12 km DSF modulator $\lambda_0$=1.551 $\mu$m. At the output of the DSF, the recovered clock pulses pass through a second polariser which is crossed with the first. In the absence of a switching beam, the recovered clock stream is totally attenuated. The amplified datastream also propagates along the DSF modulator causing NPR of the recovered clock stream in the presence of data. This NPR causes transmission through the polariser of the copropagating recovered clock pulse. The recovered clock pulses are thus reloaded with data from the original datastream and hence the function of regeneration is complete. A fibre stretcher is included at the input to the Kerr gate to phase match the clock recovered pulses and the amplified input datapulses.

FIG. 5B shows the components making up the EDFA's. The isolators I are commercially available from Isoware as model I15PIPTX-A. A pump for the fibre amplifiers is coupled via WDM couplers manufactured by JDS, model No. PB-WD1415M1-A1. The filter F is JDSTB1500S.

In the clock recovery circuit, the WDM coupler is model JDSWD1515U-A11. The DSF is manufactured by cording with the centre wavelength referred to above. The 80:20 couplers are manufactured by Sifam and the polariser is Sifam model 1550. The BPF is commercially available as JDS TB1500S Corresponding components are used elsewhere in the circuit. As an alternative to the use of or all-optical clock recovery, nodes embodying the present invention may use electronic clock recovery stages.

Figure 6:
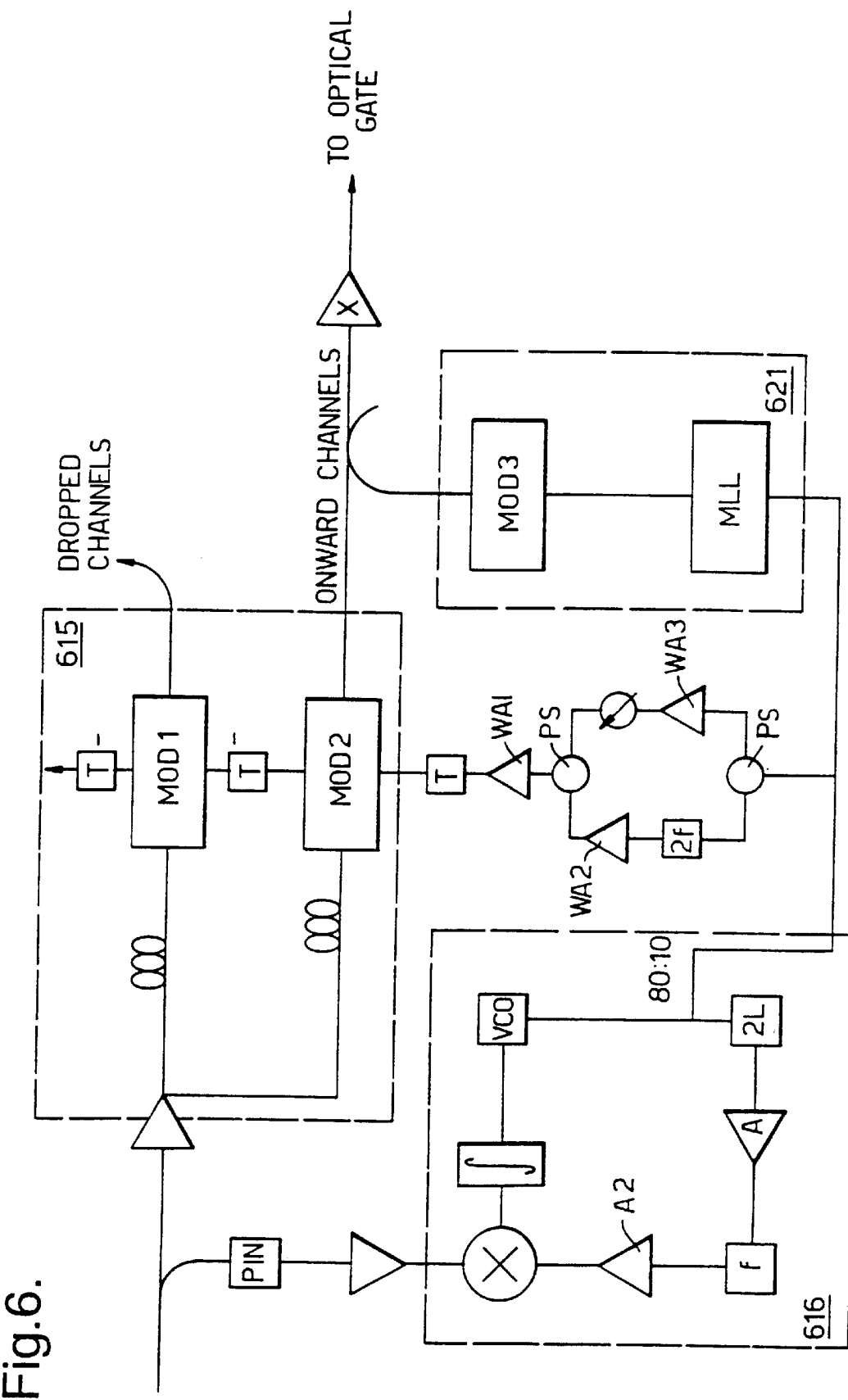
FIG. 6 is a schematic of an alternative implementation of the node using electronic clock recovery and FIG. 7 is a schematic of a network embodying the present invention.

FIG. 6 shows such an electronic clock recovery stage 616 used together with an electronically controlled multiplexer 615 and a modulator stage 621 for adding local channels into the onwards datastream. The output of the circuit shown in FIG. 6 is then regenerated using an optically controlled gate as described previously.

The multiplexer 615 in this example comprises a pair of electronically controlled amplitude modulators, available commercially as Sumitomo model TMZ1.5-20. The input to stage 615 is split 50:50 with half going to a first modulator MOD1, and the remainder to a second modulator MOD2. Bias T's available commercially as HP11612A are connected between the modulators MOD1, MOD2. The modulators are driven electrically via an amplifier stage comprising three wideband amplifiers WA1-3 and frequency doubler 2 f. Amplifier WA1 is an ERA wideband 1 W 20 GHz amplifier. WA2 is ERA amplifier model WBA20-20-10 and WA3 is ERA WBA2115-20P. The power splitters PS are available commercially as HP11667B.

Prior to the clock recovery stage the optical datastream is detected using a PIN photodiode, available commercially as HP83440B 38 GHz PIN. The resulting electronic signal is amplified using an MITEQ JS4-38004100-MA-11P-4 amplifier. A phase locked loop is then used to recover an electronic clock signal. In the loop, the frequency doublers are models SMD1840 manufactured by Watkins Johnson. The amplifier A is MITEQ model AF54-00102 and the further amplifier A2 is MITEQ J54-38004100-NA-11P-4. The VCO is a VTO-8950.

In use, the recovered electronic clock is used to drive the modulators of the multiplexer 615. These are controlled in a complementary fashion so that the first modulator MOD1 passes on the channels to be dropped locally, and completely cancels all remaining channels, while modulator MOD2 passes all channels other than those to be dropped locally. Channels to be added locally are added to the data stream using a semiconductor optical mode-locked laser MML and an 8 Ghz lithium niobate modulator, manufactured by BT & D.

As an alternative to the optically controlled gates already discussed, a travelling wave semiconductor amplifier placed within an non-linear optical loop mirror may be used. A demonstration of this technology operating at 40 Gbit/s is described in the paper by A D Ellis et al "Data driven operation of semiconductor amplifier loop mirror at 40 Gbit/s", pp1245–1247 Electronics Letters, 20th July 1995, Vol. 31, No. 15.

Further alternative forms for the optical pulse source 19 and gate 18 are described in the paper "All optical modulation 40 Ghz bit frequency conversion soliton source, A D Ellis et al, Electronics Letters, 3rd August 1995, Vol. 31, No. 16 PP1362–1363"

As noted above, the use of a pulsed source 19 may in some cases advantageously be replaced by a local CW laser source. In this case the gate 18 combines the functions of pulse forming and gating. The CW laser source may be, for example, a DFB semiconductor laser operating at 1.558$\mu$m, and the gate 18 may use XPM modulation in an 11 km dispersion shifted fibre. Appropriate components are discussed in the paper by D M Patrick and A D Ellis published at Electronics Letters, 22nd July 1993, Vol. 29, No. 15 pp1391–1392.

Figure 7:
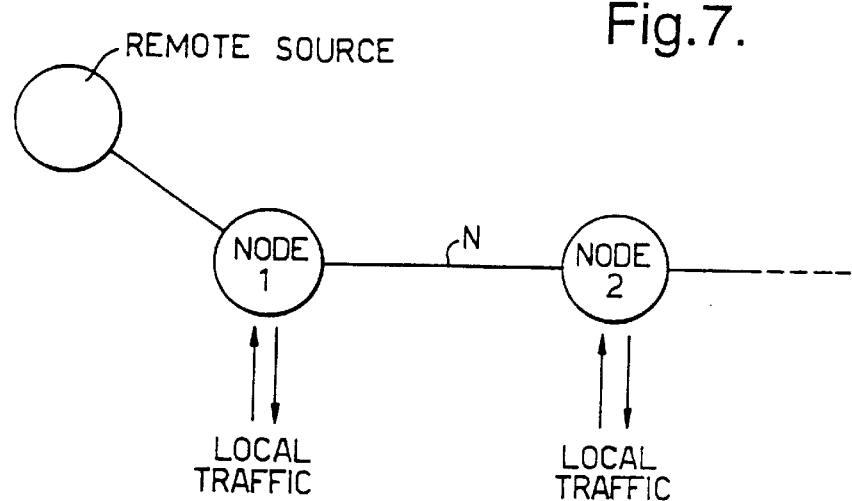

The invention is applicable to a variety of different network topologies. One simple topology is illustrated in FIG. 7, in which each of the nodes, NODE1, NODE2, etc. interfaces local traffic to a broadband optical network N. The network might be used in telecommunications, or, e.g. for the interconnection of processors in an optical computing system.

Figure 8:
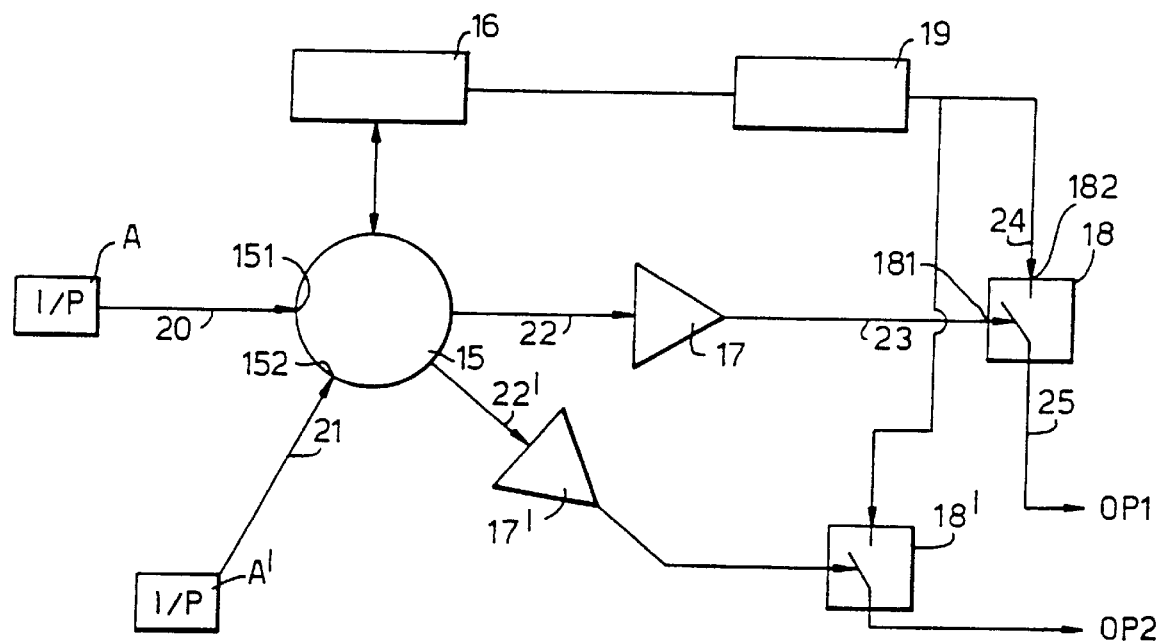
FIG. 8 is a schematic of a cross-connect node.

Equally, the node may perform functions other than a simple ADD/DROP function. For example, FIG. 8 shows a node configured for a cross-connect function with two input ports A,A' and two output ports OP1, OP2. By comparison with FIG. 2, the node includes an additional amplifier 17' and gate 18'. The same components may be used to implement the gate 18' as discussed above in relation to FIG. 2 and gate 18. Such a cross-connect node might be used, for example, in an SDH switching centre.

We claim:

1. An optical time division multiplexed communication system comprising:
   a) an optical network; and
   b) a plurality of nodes which are interconnected by the optical network, and in which at least one node comprises:
      i) a multiplexer having a plurality of input means for receiving data signals in which at least one of said input means is connected via an input port of the rode to the optical network in use receives an OTDM data stream from a source remote from the said at least one node, and another of the said input means is connected to a local data source;
      ii) a local source of optical radiation;
      iii) an optically controlled gate having
         a control input connected to an output of the multiplexer,
         a signal input connected directly or indirectly to the local source of optical radiation, and
         a signal output connected to the output of the node and which in use outputs an OTDM data stream including both data from the local data source and data from the source remote from the at least one node, the said OTDM data stream comprising optical radiation from the local source only.

2. A system as claimed in claim 1, wherein the local source of optical radiation is a continuous wave source.

3. A system as claimed in claim 2, wherein the optically controlled gate comprises an optical modulator, connected to receive the multiplexed optical signal from the multiplexer and continuous wave optical radiation from the source of optical radiation, and to transmit optical pulses modulated in accordance with the multiplexed optical signal.

4. A system as claimed in claim 1, wherein the source of optical radiation is a source of optical pulses.

5. A system as claimed in any preceding claim, further comprising clock recovery means (16) for recovering a clock signal from an input data signal.

6. A system as claimed in claim 5, wherein the clock recovery means (16) are arranged to generate an electrical clock signal and said electrical clock signal controls a source of optical pulses (19).

7. A system as claimed in claim 5, wherein the clock recovery means (16) includes the source of optical pulses (19) and in use, generates an optical clock signal.

8. A system as claimed in claim 1 wherein the multiplexer is an all optical device.

9. A system as claimed in claim 8, wherein the multiplexer comprises a non-linear loop mirror.

10. A system as claimed in claim 9, wherein the non-linear loop mirror includes a semiconductor laser amplifier.

11. A system as claimed in claim 1, wherein the optically controlled gate comprises a semiconductor laser amplifier.

12. A system as claimed in claim 1, wherein the optically controlled gate comprises an interferometric device.

13. A system as claimed in claim 12, wherein the interferometric device is a non-linear loop mirror.

14. A system as claimed in claim 13, wherein the non linear loop mirror includes a semiconductor laser amplifier.

15. A system according to claim 1, in which the gate is an NPR (Non linear Polarisation Rotation) gate.

16. A node as claimed in claim 15, wherein the non-linear loop mirror includes a semiconductor laser amplifier.

17. A node according to claim 2, in which the gate is a NPR (Non-linear Polarisation Rotation) gate.

18. A system according to claim 1 including a plurality of input ports arranged to receive different respective remotely gernerated OTDM data streams, and a plurality of output ports, the node being configured for a cross-connect function.

19. A method of operating a node in an optical time division multiplexed communication system, the method comprising the steps of:
   receiving a plurality of data signals at the node, including a locally sourced data signal, and a data signal which is received via the network from a source which is remote from the node;
   multiplexing together both the locally sourced data signal and the data signal from the source which is remote from the node;
   applying the multiplexed data to a control input of an optical gate which is connected directly or indirectly to a local optical source and thereby generating an OTDM data stream comprising optical pulses from the local optical source only; and
   outputting the said OTDM data stream from node.

20. A method according to claim 19, in which the node cross-connects a plurality of remotely sourced OTOM data streams.

* * * * *